(12) United States Patent
Westergaard (10) Patent No.: US 9,337,656 B2
(45) Date of Patent: May 10, 2016

(54) METHOD AND SYSTEM FOR FORECASTING WIND ENERGY

(75) Inventor: Carsten Hein Westergaard, Houston, TX (US)

(73) Assignee: Vestas Wind Systems A/S, Aarhus N (DK)

( * ) Notice: Subject to any disclaimer, the term of this patent is extended or adjusted under 35 U.S.C. 154(b) by 764 days.

(21) Appl. No.: 13/639,824

(22) PCT Filed: Apr. 6, 2011

(86) PCT No.: PCT/DK2011/050113
§ 371 (c)(1),
(2), (4) Date: Oct. 5, 2012

(87) PCT Pub. No.: WO2011/124226
PCT Pub. Date: Oct. 13, 2011

(65) Prior Publication Data
US 2013/0046492 A1    Feb. 21, 2013

Related U.S. Application Data

(60) Provisional application No. 61/321,961, filed on Apr. 8, 2010.

(30) Foreign Application Priority Data

Apr. 8, 2010    (DK) ................................ 2010 70139

(51) Int. Cl.
*G01R 21/00* (2006.01)
*H02J 3/00* (2006.01)
(Continued)

(52) U.S. Cl.
CPC . *H02J 3/00* (2013.01); *H02J 3/386* (2013.01); *H02J 2003/003* (2013.01); *Y02E 10/763* (2013.01); *Y04S 10/54* (2013.01)

(58) Field of Classification Search
CPC ............................. H02J 3/386; H02J 2003/003
See application file for complete search history.

(56) References Cited

U.S. PATENT DOCUMENTS 6,975,925 B1    12/2005    Barnes et al.
2012/0185414 A1*    7/2012    Pyle et al. ........................ 706/11

FOREIGN PATENT DOCUMENTS

JP    2007233639 A    9/2007
WO    2008092462 A2    8/2008

OTHER PUBLICATIONS

Danish Patent and Trademark Office Search Report dated Nov. 2, 2010, for Danish Application No. PA 2010 70139.
(Continued)

*Primary Examiner* — Phuong Huynh
(74) *Attorney, Agent, or Firm* — Patterson + Sheridan LLP (57) ABSTRACT

A method for forecasting wind energy production is disclosed. The method includes collecting power data indicative of power output from a set of wind energy installations with a first wind energy installation at a first site and a second wind energy installation at a second site, and estimating the available power output at a forecasting site located at a geographic position. The estimating is based on power data from the set of wind energy installations by projecting the power data towards the future and/or the geographic position of the forecasting site. Further disclosed is a method for scheduling wind energy production for an electricity grid and a wind energy production forecasting system configured for forecasting output power of a wind energy installation.

16 Claims, 5 Drawing Sheets

(51) Int. Cl.
*H02J 3/38* (2006.01)
*G01R 21/06* (2006.01)

(56) References Cited

OTHER PUBLICATIONS

International Search Report dated Jul. 1, 2011, for International Application No. PCT/DK2011/050113.
"Notice from the European Patent Office dated Oct. 1, 2007 Concerning Business Methods", Official Journal EPO, vol. 30, No. 11, Nov. 1, 2007, pp. 592-593.

* cited by examiner

METHOD AND SYSTEM FOR FORECASTING WIND ENERGY

FIELD OF THE INVENTION

The present invention relates to wind-energy-conversion technology and, for example, to a method and a system for forecasting wind energy production.

BACKGROUND

The known methods of wind energy forecasting comprise meteorological weather forecasting and converting this weather forecast into wind forecast that is converted into wind energy forecast. Conventionally expected wind energy production is based on meteorological wind speed data; the expected production is then derived by using a model of the wind energy installation concerned, e.g. in the form of wind-speed dependent power curves.

Known forecasting methods are not always optimal so that there is a need for improved wind energy production forecast.

SUMMARY

It is an object of the present invention to provide methods and apparatus for enabling improved and more precise forecasting of wind energy production from wind energy installations.

According to a first aspect a method for forecasting wind energy production is provided. The method comprises collecting power data indicative of power output from a set of wind energy installations comprising a first wind energy installation at a first site and a second wind energy installation at a second site, and estimating the available power output at a forecasting site at a geographic position. The estimating is based on power data from the set of wind energy installations by projecting the power data towards the future and/or the geographic position of the forecasting site.

According to a second aspect a method is provided for forecasting wind energy, the method comprising collecting power data indicative of power output from a set of wind energy installations comprising a first wind energy installation at a first site and a second wind energy installation at a second site, and estimating the available power output at a forecasting site based on power data from the set of wind energy installations and power gradients derived from the power data.

According to another aspect a wind energy production forecasting system comprising a processor and a memory is provided. The processor is programmed for estimating the available power output at the forecasting site based on power data indicative of power output from a set of wind energy installations comprising a first wind energy installation and a second wind energy installation by the method according to the first or the second aspect.

According to a still further aspect which may be claimed independently a method is provided for scheduling wind energy production for an electricity grid which is fed by at least one wind energy installation and by at least one power plant with schedulable production, wherein wind energy production is forecast by the method according to the first or second aspect, and the forecast wind energy production is taken into account in the production scheduling of the at least one power plant.

"Projecting" is to be understood in its generic meaning rather than its specific meaning in geometry and optics.

Other features are inherent in the methods and products disclosed or will become apparent to those skilled in the art from the following description of embodiments and its accompanying drawings.

GENERAL DESCRIPTION OF EMBODIMENTS

It has been recognised that the precision of conventional wind energy forecasts based on wind speed and a derivation of expected power production using power curves etc. suffers due to uncertainties introduced by multiple factors.

For example, wind energy is sensitive to the cube of the wind speed which means that the inaccuracy of power forecast as a first order approximation is 3 times higher than the wind speed forecast. For example, if the uncertainty of the wind speed is 5%, the power uncertainty is of the order 15%. Another source of errors in the conventional methods may be due to the fact that a wind turbine (or wind energy installation) feels a wind speed averaged over its rotor area while typical wind speed measurements relate to a smaller area. A further source of errors in conventional methods is an uncertainty in the knowledge of the power curves. Moreover, even if the power curve (as a function of the wind speed) is known precisely for steady wind conditions wind speed and direction will dynamically change, and a wind turbine will not perfectly be able to instantly adapt its operating state (e.g. rotor speed and/or azimuth) angle due to the current wind speed and direction due to its mechanical and control-caused inertia, so that operation will be sub-optimal to an extent which depends on wind dynamics. A complication of the conventional methods is a limitation of wind turbines' power output to a nominal design power output (corresponding to a "nominal wind speed") which effectively is a saturation effect—above the nominal speed the power output will not increase any more with increasing wind speed.

The methods and system described herein utilize measured power data of wind energy installations for forecasting power performance of one or more wind energy installations and operate on such power data for obtaining improved forecasting of possible wind energy power from a wind installation.

The methods and system reduce or eliminate the need for calculating or estimating wind energy based on power curves that implies inaccuracy in wind energy forecasting.

By measuring the wind energy production of a wind turbine its rotor with its actual speed, pitch and azimuth setting and the resulting wind-energy conversion coefficient is used as a measurement probe. It implicitly takes the cubic law between wind speed and producible power into account, averages implicitly over the rotor area, uses implicitly the actual power curve, and reflects automatically any sub-optimality due to wind gusts and wind direction changes. In some embodiments it may also implicitly include the saturation effect due to the limitation to the nominal design power output. Thus, accuracy and/or simplicity is improved over conventional methods which rely on wind speed measurements and do not—or not sufficiently—take these effects into account or, if they attempt to correct for such effects, are relatively complicated.

In some embodiments the "forecasting" includes projecting current wind power production into the future in order to obtain a prediction. In other embodiments forecasting includes projecting current (or past) wind power production data towards a geographical site which is different from the site were the wind power production is (or was) measured. In some embodiments a combined projection in time and space is made; i.e. future production at a different geographical site is predicted.

The methods and system described herein utilize that data relating to wind power production may be achieved from several thousands of wind turbines. The data sampling time needed may depend on the distance and energy transport speed. It is suggested to use the power produced by the wind energy installations for forecasting power performance. This is done by determining the transport of energy density. Wind energy forecasting may also be obtained for possible future wind energy installation sites, e.g. by interpolation or extrapolation.

The forecasting methods are carried out computer-based, i.e. the activities of collecting power data and estimating the available power output at a forecasting site by projecting the power data towards the future and/or the geographic position of the forecasting site are carried out by an accordingly programmed computer when the program is executing on the computer.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

The figures are schematic and simplified for clarity, and they merely show details which are essential to the understanding of the embodiments, while other details have been left out. Throughout, the same reference numerals are used for identical or corresponding parts.

DETAILED DESCRIPTION

The present system and methods are based on power data indicative of power output from a set of wind energy installations. Thus, the methods and the system are based on direct information about electrical energy produced rather than wind speed. Thus, although in some embodiments a conventional weather forecast predicting wind speed and/or wind direction is used as an additional input to perform or improve the projection into the future the basis of the forecast is the measured wind power production. Some embodiments do not use any weather forecast predicting wind speed and/or wind direction at all.

The wind energy production forecast may be one of the input parameters for energy production scheduling in an electricity grid, e.g. by providing this forecast information to the grid operator. Most conventional non-renewable (and some types of renewable) electricity producers (power plants), e.g. gas, oil, and coal fired thermal power plants or certain hydropower plants can produce electric power on demand. The production by these types of producers can therefore be scheduled in advance to meet the expected electricity demand, e.g. by the grid operator. These producers are therefore also referred to as "schedulable producers".

In a grid only fed by schedulable producers the only uncertainty is due to the fact that electric consumption is uncontrolled. Although uncontrolled the consumption is predictable to a relatively high precision. According to the prediction the producers are scheduled. Only a relatively small fraction of the total consumption exhibits unpredictable statistical fluctuations; this fraction is not schedulable. To cope with these unpredictable fluctuations a certain percentage of the producers operate below nominal power and can dynamically reduce or increase production on demand in order to instantly adapt the overall production to the overall consumption (this is typically realized by feed-back control to keep the grid frequency constant).

As wind cannot be increased on demand wind energy-based producers are not (or not completely) schedulable and introduce another source of fluctuation (here from the production side) into the grid.

However, by the wind power forecast as described herein this production-side fluctuation can at least be predicted with considerable certainty and precision. In some embodiments, the prediction is an input parameter in the scheduling process performed e.g. by the grid operator of the schedulable producers. The scheduling is, for example, does not only counteract predictable load variations but also the forecast variations of wind power production. For example, if the forecast predicts a reduction of wind power production the schedule can counteract by instructing schedulable producers to compensate for the reduction e.g. in a reciprocal manner, and vice versa. In some embodiments the scheduling is performed automatically by a suitably programmed scheduling computer.

The scheduling can be carried out at different time scales. For example, in some embodiments, a short-term forecast of wind energy production (e.g. with a prediction for the next minutes) is provided. In such embodiments the grid operator's scheduling computer instructs schedulable short-term producers to produce electric power reciprocally to the wind energy forecast. In some embodiments, a medium-term (e.g. hours) forecast of power output is provided. In such embodiments the grid operator's scheduling computer instructs schedulable medium-term producers to produce electric power reciprocally to the wind energy forecast.

In some embodiments, the set of wind energy installations comprises a number of wind installations at different sites including a first wind energy installation at a first site and a second wind energy installation at a second site. The set of wind energy installations may comprise at least 500 wind energy installations. A wind energy installation may comprise one single wind turbine or a plurality of wind turbines or sets of wind turbines, the later often called wind parks or wind farms. A single wind turbine or a wind turbine park including a number of wind turbines may be referred to as a wind energy installation.

In some embodiments wind turbines operating at nominal power output are excluded from the collected power data, or their power output is included but corrected, e.g. based on a local wind speed measurement so as to better reflect the power that would be producible without a design power limit. These embodiments aim at getting rid of the saturation effect due to design power limits.

In other embodiments, however, the saturation effect due to design power limits is intentionally included, because saturation may also happen to take place, e.g. at a forecasting site in the future. In such embodiments wind turbines operating at nominal power output are included in the collected power data so that the set of collected power data reflects the saturation effect and represents what is actually produced (not what could be produced theoretically).

The power data may be projected towards the future and/or the geographic position of the forecasting site for estimating the available power output at the forecasting site.

The method comprises estimating the available power output, i.e. wind energy production, at the forecasting site. The forecasting site may be identical to one of the first and the second site, i.e. the forecasting site may be the first site with the first wind energy installation or the second site with the second wind energy installation. Thus, the available future power output from an existing wind energy installation may be forecast.

Additionally or alternatively, the methods may be used for planning future wind energy installation sites by enabling precise forecast of power output for possible new wind energy installations at new sites. This is useful for analysing potential sites and selecting the best site among candidates, and for selecting e.g. a suitable tower height and/or wind-turbine type (belonging to a suitable wind class) for a possible site.

In some embodiments, collecting power data comprises collecting at least a first and a second set of power data at a first and a second time, respectively. Thus, at least two time-shifted sets of data are collected. Each set of power data may be indicative of power output from at least the first and the second wind energy installation. The power data of each wind energy installation may be obtained by measuring the effective electrical power output being generated by this wind energy installation. For example, this is done with the aid of measurement instruments that are (usually already) installed for each wind turbine or by measurement instruments in common for each wind energy installation.

In some embodiments, power data indicative of power output from wind energy installations may be collected at selected interval or intervals, such as at least every 30 minutes, at least every 15 minutes, e.g. every 10 minutes or every 5 minutes. Intervals down to e.g. 10 seconds may be employed for selected wind energy installations, e.g. in order to obtain local power output forecasting.

The power data indicative of power output from a set of wind energy installations may comprise scalar information about the wind energy production, e.g. electrical power or electrical energy (produced in a specific time windows). The power data may be a map of wind energy production for some or all sites. In some embodiments, one set of power data indicative of power output of some or all sites is measured substantially at the same point of time. Thus, power data may be a scalar field with respect to the geographic positions of the sites representing a snap-shot of wind energy production.

In some embodiments, estimating the available power at the forecasting site by projecting the power data towards the future is based on what is called an "optical flow method". The optical flow is a motion, or a pattern of motions, deduced from differences between the at least first and second set of power data. Optical flow methods are computer-based methods normally used to determine a motion of an object in an image. A description of gradient based optical flow methods (gradient based methods) can be found in an article, e.g. David J. Fleet et al., Optical Flow Estimation, in "Mathematical Models in Computer Vision: The Handbook", N. Paragios, Y. Chen, and O. Faugeras (editors), Chapter 15, Springer, 2005, pp. 239-258. Since a (digital) image is e.g. represented by lightness values in different pixels an analogy can be drawn to power outputs of wind turbines (=analogue to lightness values) at different geographic sites (=analogue to pixels). A motion in an image results in changes of lightness values at the different pixels. Thus, a change of specific power outputs at the different wind turbine sites is analogue to a motion in an image.

According to the optical flow method applied in some embodiments of the forecast methods, the motion of the "image" represented by the power outputs at the different sites is calculated from at least two sets of power data, representing the power data at a first point of time and at a second point of time with a known time difference. Thus, a velocity, i.e. speed and direction, of the motion of the image is calculated from the distance of the motion and the time difference. The motion thus determined is then projected towards a future point in time. The resulting moved "power image" (power outputs at different sites) is the forecast of the power output. In some embodiments certain assumptions are made, e.g. the assumption that the "image" is only moved, but apart from that remains constant in time, and/or that the assumption that the velocity this determines remains constant ("inertia"). In some embodiments, acceleration of the "power image" is also determined, and the acceleration thus determined is taken into account in the forecast (e.g. the acceleration can be assumed to remain constant rather than the velocity).

The use of an optical flow method is only exemplary. More generally the forecast of wind energy production towards the future is estimated by calculating the time-dependent motion of (the scalar) wind energy production relative to the geographical positions of at least the first site and the second site.

In some embodiments, estimating the available power output comprises projecting the power data towards the geographic position of the forecasting site. The projection may comprise at least one of an extrapolation method and an interpolation method. Here, the projecting is based on the power data indicative of power output from the wind energy installations at least at the first and second site.

Collection of power data from the large number of wind energy installations improves accuracy of estimation of available power output for sites where no power data are available, e.g. by interpolation. This is useful in modeling new wind energy installations and predicting their performance at new sites, etc.

In some embodiments the forecast in time is combined with geographical extrapolation (or interpolation). For example, current power measurements at sites A, B, and C are used to predict wind power production at a different site D in one hour from now.

Further, in some embodiments forecasting is based on data received from external meteorological data sources, such as weather databases, satellites, etc., e.g. as provided by National Oceanic and Atmospheric Administration (NOAA).

In some embodiments, estimating the available power output at the forecasting site is based on weather data of geographic positions of the wind energy installations. The weather data may comprise at least one of wind speeds and wind directions.

In some embodiments, estimating the available power output at the forecasting site is based on at least one of a direction and a magnitude of a power gradient derived from the power data. The power gradient allows estimating power output by projecting known power output from the first or second site towards the forecasting site along the gradient.

The present methods and system map and forecast power performance by utilizing power data from wind energy installations as these are online, connected and can transmit performance or power data as often as requested. Offline data may also be considered, where this proves to be practical.

Collecting power data from wind parks, individual wind turbines and wind turbines from around the world will allow this to take place.

The method comprises collecting power data for a set of wind energy installations. Power data is collected, e.g. at 10-minute intervals, from a set of wind energy installations including at least the first and second wind energy installation. Power data $P(t,h,X_n)$, where t is time, $X_n$ is the geographical position of the wind energy installation n and h is hub height (height of wind rotor axis above ground level of each individual wind turbine at the installation n), may be collected. Power data for a wind energy installation may comprise power data for one or more wind turbines. The power data may be normalized, such as to standard air density and pressure.

In some embodiments, the method may comprise calculating one or more power densities from the power data indicative of power output from the set of wind energy installations. Power density $p(t,h_n,X_n)$ may be given as $p(t,h,X_n)=P(t,h,X_n)/A_{Rotor}$, where $A_{Rotor}$ is the rotor area providing the power. Power densities may be calculated by the wind energy forecasting system and/or calculated and fed to the forecasting system as power data from the wind energy installation(s).

In some embodiments, the method may comprise calculating unified power densities, e.g. at a predetermined height $h_0$, for one or more wind energy installations in the set of wind energy installations. The height $h_0$ may be freely chosen, wherein a height gradient of the wind speed, especially at ground level, may be taken into account. The unified power densities $\pi(t,h_0,X_n)$ may be computed by applying a transfer function $T(X_n, \ldots)$ to the one or more power densities $p(t,h,X_n)$.

Up to now, the transfer function $T(X_n, \ldots)$ is based on the rotor area $A_{Rotor}$ and the hub height h. In some embodiments, additionally, or as an alternative, the transfer function $T(X_n, \ldots)$ may be based on wind turbine data (type, operational status, operating parameters, etc). Furthermore, additionally, or as an alternative, the transfer function $T(X_n, \ldots)$ may be based on local area information related to the site including but not limited to landscape profile that locally influences wind speed or turbine location inside park where shadowing effects between neighbored wind turbines occur. Moreover, local meteorological data and other factors may be considered by the transfer function $T(X_n, \ldots)$. In such embodiments at least one of the power density and the unified power density depend on alternative or additional parameters.

As local area information used for the purpose of unifying the power density, normalizing and identifying transfer functions $T(X_n, \ldots)$ for different sites may be of limited quality or not even accessible, the method may allow for power data $P(t,h,X_n)$ or $p(t,h,X_n)$ to be used in the forecasting.

In some embodiments, weighted significance may be used for forecasting the available power output. For example, a wind energy installation with a bigger number of wind turbines may be given more weight than a wind energy installation with less wind turbines.

Estimating the available power output at a forecasting site may comprise estimating one or more unified power densities at a forecasting site. Estimating the available power output at a forecasting site may be based on measurements of one or more meteorological parameters, e.g. wind velocities, i.e. wind speeds and/or wind directions, at the wind energy installations.

Estimating the available power output at a forecasting site may be based on cross correlation of power data indicative of power output from the set of wind energy installations, such as from the first wind energy installation and the second wind energy installation.

Estimating the available power output may be based on power data from at least 5 different wind energy installations at different sites, such as from at least 10, at least 100, at least 1000 different wind energy installations at different sites.

For example, if we treat the power density or the unified power density as a passive scalar, the projection of the scalar can be directly determined from cross correlation between wind energy installations.

For example, this is found for the wind energy installation n at site $X_n$ by finding the maximum value of $$C(t+\Delta t, X_n, X_i) = \Sigma \pi(t,h_0,X_n) * \pi(t+\Delta t,h_0,X_i)$$

summed over time window. That is finding the best correlation between the wind energy installation at $X_n$ and the wind energy installations in the data base $X_i$, measured at a time difference $\Delta t$, summed over a time window of observations. For example, the best correlation may be found at time difference of 30 minutes and distance of 81 km between two wind energy installations, meaning that the power density travels at about 45 m/s in that direction. A correlation function where $\pi(t,h_0,X_n)$ is replaced with $P(t,h,X_n)$ or $p(t,h,X_n)$ may be employed.

Wind energy installations are embedded into the earth boundary layer and the weather propagation is mainly driven by geotropic mechanisms outside the earth boundary layer. Accordingly, the method may in addition to the power data collect data related to these mechanisms, e.g. temperature and/or pressure data, and compute propagation velocity (speed and/or direction) from these two quantities, as these (in particular the pressure) are strongly correlated with the outer part of the part of the boundary layer. Thus, the method for forecasting wind energy may be based on one or more scalars. It is believed that incorporation of one or more scalars may improve the forecasting of available power. Examples of scalars include but are not limited to one or more of temperature, pressure and gases released in the airflow. If multiple points of scalar values are known as function of time by measurements, the transport velocity, especially speed and direction, of the scalars can be determined, for example by cross-correlation methods. Accordingly, estimating or forecasting the available power output at a forecasting site may be based on transport of other scalars, such as one or more of temperature, pressure and gases released in the airflow.

For example, this may be found for the wind energy installation n at site $X_n$ by finding the maximum value of $$C(t+\Delta t, X_n, X_i) = \Sigma \pi(t,h_0,X_n) * f(t,X_n) * \pi(t+\Delta t,h_0,X_i) * f(t+\Delta t,X_i),$$

where f is a suitable scalar, for example pressure or temperature. A correlation function where $\pi(t,h_0,X_n)$ is replaced with $P(t,h,X_n)$ or $p(t,h,X_n)$ may be employed.

The method may comprise sending data indicative of available power output at a forecasting site to a wind energy installation operator.

Estimating the available power output at a forecasting site is based on power gradients derived from the power data. Power gradients may be derived by use of known methods ranging from correlation methods to neural network pattern recognition algorithms.

The method enables that transport of the power density can be projected over large distances and thus over long time, e.g. up to 24 hours or longer. Combining the power density transport function with other scalars it is contemplated that several days of good forecasting may be achieved.

Figure 1A:
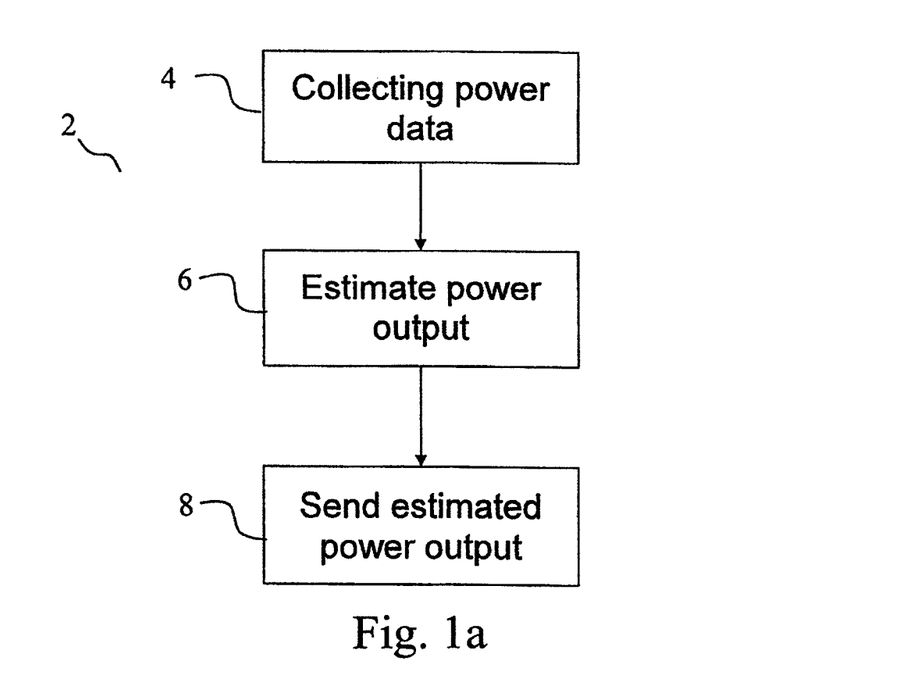
FIG. 1a schematically illustrates an embodiment of the method.

FIG. 1a schematically illustrates an embodiment. The method 2 comprises collecting 4 power data indicative of power output from a set of wind energy installations comprising a first wind energy installation at a first site and a second wind energy installation at a second site. Power data $P(t,h,X_n)$ may be collected for a large number of wind energy installations at different sites around the world. The distance between the first site and the second site may be at least 10 km, such as at least 50 km. It is an advantage of the present invention that the method is scalable, and can be deployed locally, such that the distance between the first site and the second site may be less than 10 km. A sub-scale system could produce fast correlation between wind energy installations closely spaced, if the data infrastructure allows for fast communication. Further, the method 2 comprises estimating 6 the available power output at a forecasting site located at a geographic position. The estimating is based on power data from the set of wind energy installations and projection of the power data towards the future and/or the geographic position of the forecasting site. Estimating 6 the available power output optionally comprises determining or calculating power densities $p(t,h,X_n)$ of each of the wind energy installations in the set of wind energy installations. The power densities may be calculated at the wind energy installation or in a SCADA system, thus collecting 4 power data may comprise collecting power density data $p(t,h,X_n)$ from the set of wind energy installations. Estimating 6 the available power output comprises calculating unified power densities $\pi(t,h_0,X_n)$ by applying a transfer function $T(X_n, \ldots)$ to the power densities $p(t,h,X_n)$. The available future power output at time $t+\Delta t$ for a forecasting wind energy installation at a forecasting site, e.g. the first wind energy installation, is estimated based on unified power densities of at least the first wind energy installation and the second wind energy installation.

The method does not require, although it may be advantageous, that the power data is collected synchronously from the wind energy installations. However, the time of the power data collection must be known. The power data may be time-shifted in order to synchronize the power data.

In this example, two sets of power data are measured within a known time difference. Each set of power data represents a snap-shot of wind energy production of the set of wind energy installations. This enables a movement, or velocity, of the power field (represented by the snap-shots) to be projected into the future. The future power output $\pi(t+\Delta t,h_0,X_n)$ is, for example, calculated by an optical flow method based on the two snap-shots. The optical flow method determines differences between wind energy productions of each site and calculates a movement of the wind energy production relative to the sites. To estimate the future wind energy productions of the sites this movement is projected into the future.

Figure 1B:
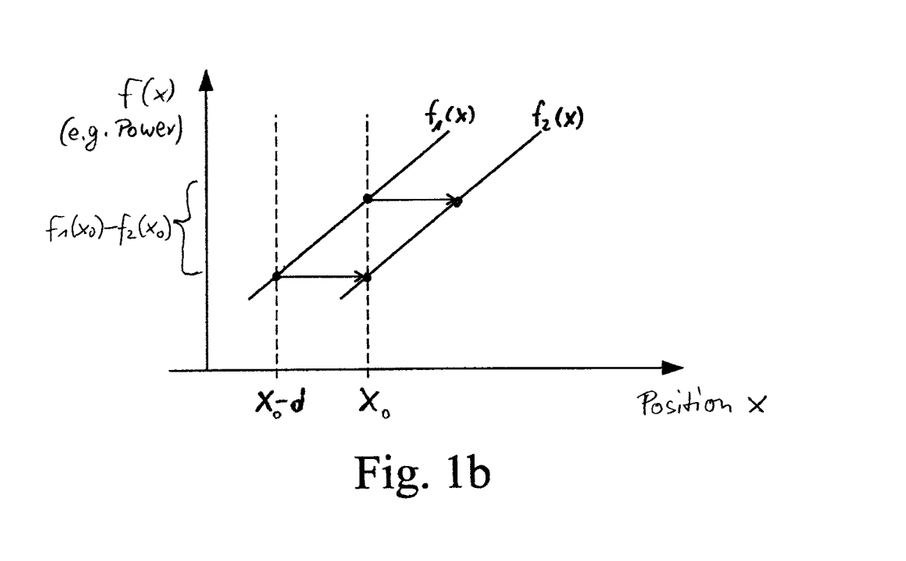
FIG. 1b illustrates an exemplary projection method based on anoptical flow method in one dimension, FIG. 2 schematically illustrates a forecasting network including a set of wind energy installations connected to a wind energy forecasting system.

FIG. 1b illustrates an exemplary method to determine the movement, or velocity, of a measured power field. The example is a gradient-based optical flow method. For the purpose of illustration the "optical flow" is shown for only one dimension in FIG. 1b (this would correspond to wind turbines arranged along a line and a motion of the "power image" produced by the wind turbines along the line). In FIG. 1b $f_1(x)$ and $f_2(x)$ are one-dimensional sets of power data (with the line of wind turbines assumed to be nearly continuous) measured with a known time difference. In FIG. 1b it is assumed that the "power image" moved a distance d between the two measurements. Thus, $f_2(x)$ is a locally translated version of $f_1(x)$, wherein $f_2(x)=f_1(x-d)$. In one dimension $f(x)$ needs to be measured only at one point on $x_0$. By means of the gradient (which, in one dimension, is the derivative $f'_1$ of the power distribution $f(x)$ at the position $x_0$) at the measurement point $x_0$ the distance d can be inferred from the measured difference $f_1(x_0)-f_2(x_0)$ of the power at the two different points in time by $$d = \frac{f_1(x_0) - f_2(x_0)}{f'_1(x_0)}$$

where it is assumed that the power does not change during the movement, which is also referred to as "intensity conservation" in optical flow methods (cf. the article by David J. Fleet et al., Section 2 "Basic Gradient Based Estimation", in particular formula (1.3)).

In two dimensions the power is measured at at least two different points, and the two measurements are combined, in order to uniquely determine not only the displacement d, but also the direction of the displacement of the "power image". In some embodiments the power is measured at more than two points/sites; the resulting system of equations is then over-determined, and an approximate solution is estimated by one of the common estimation methods, e.g. the least-squares method. In some cases (depending on the specific combination of geographic positions and gradient field more measurements at more than two points/sites (e.g. measurements at three, four, n points/sites) are required in order to obtain a unique solution of the displacement d and the direction of the displacement. In such cases the measurement is only over-determined if measurements are made at four, five, n+1 points/sites. As to details of the two-dimensional case see e.g. the article by David J. Fleet et al., Section 2 "Basic Gradient Based Estimation, in particular sub-sections "Intensity Conservation" and "Least-Squares Estimation".

The velocity of the thus determined movement of the "power image" is then calculated from the displacement d and the known time difference (e.g. by dividing the displacement d by the time difference). By extrapolating, or "projecting", the movement into the future a "power image" for a future point of time is then obtained. The extrapolation, or projection, is in some embodiments based on an inertia assumption (i.e. that the velocity thus determined remains constant).

In another example no prediction in time but only a geographic prediction of wind energy production is desired. To this end measurement of only one set of power data indicative of power output from the set of wind energy installations is sufficient. The available power output is estimated by projecting the power data towards the geographic positions of the forecasting sites by an interpolation method for the forecasting sites between sites of the installations or by an extrapolation method for the other forecasting sites.

Returning to forecast in time, the available future power output $\pi(t+\Delta t,h_0,X_n)$ may be forecasted for a suitable time frame $\Delta t$, e.g. ten minutes, one hour, three hours, six hours, twelve hours, eighteen hours, one day, two days or more.

The forecast unified power densities are transformed to power densities by application of the inverse $T^{-1}(X_n, \ldots)$ of the transfer function $T(X_n, \ldots)$ in order to obtain $p(t+\Delta t,h,X_n)$ via $\pi(t+\Delta t,h_0,X_n)$ for a given wind energy installation site $X_n$. The forecast can be issued continuously or at selected intervals and may be updated as new power data is acquired for the wind installations.

Optionally, the method 2 comprises sending 8 data indicative of available power output at the forecasting site to a wind energy installation operator. The data may comprise power data of a number of wind energy installations enabling an operator to plot power densities or unified power densities as an animation over time, e.g. a color coded map showing the (unified) power densities for a selected geographical area with wind energy installations n.

In another example, the (future) wind energy production is forecast to provide input for scheduling power production of schedulable power producers. For example, the schedulable power producers are scheduled to vary their power in a manner reciprocal to the forecast wind power production.

Figure 2:
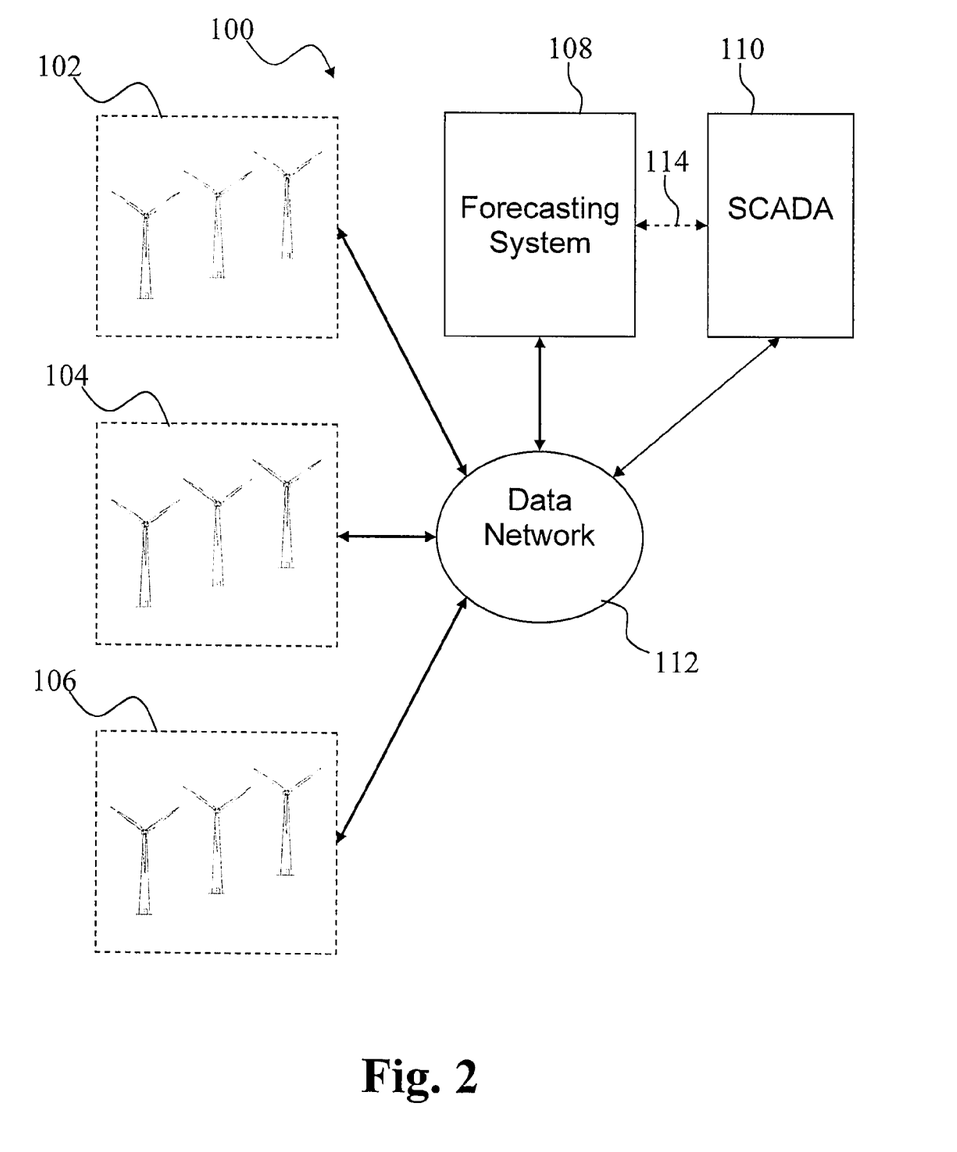

FIG. 2 schematically illustrates a forecasting network including a set of wind energy installations comprising wind energy installations 102, 104, 106, the forecasting network further including a wind energy forecasting system 108 and optionally a Supervisory Control And Data Acquisition (SCADA) System 110 connected via data network 112. The wind energy forecasting system 108 is configured for estimating the available power output at a forecasting site, e.g. the first wind energy installation 102, based on power data indicative of power output from a set of wind energy installations comprising the first wind energy installation 102 and the second wind energy installation 104. The power data of wind energy installations 102, 104, 106 are collected via data network 112, optionally via SCADA system 110. The wind energy forecasting system 108 may be directly connected to the SCADA system 110 via connection 114. The wind energy forecasting system 108 may be configured for sending data indicative of available power output at a forecasting site to an operator of a wind energy installation at the forecasting site, e.g. via data network 112 or other network.

Figure 3:
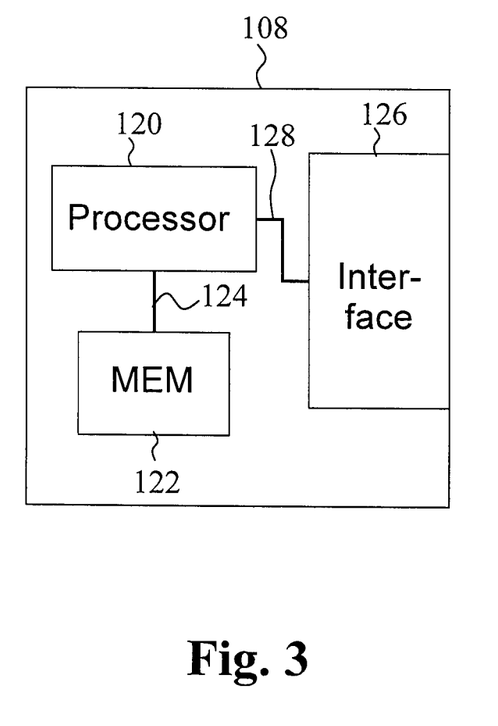
FIG. 3 is a block diagram schematically illustrating an exemplary forecasting system.

FIG. 3 is a block diagram schematically illustrating an exemplary forecasting system. The forecasting system 108 comprises a processor 120 and memory 122 connected to the processor 120 via data connection 124, and an interface 126 comprising a data interface and a user interface connected to the processor via data connection 128. The user interface may comprise a display and/or a keyboard and/or connectors for a display/keyboard. The processor 120 is adapted to collect power data via the interface 126 and estimating the future unified power density $\pi(t+\Delta t, h_0, X_n)$ at wind energy installation site $X_n$ based on power data from the set of wind energy installations.

Figure 4:
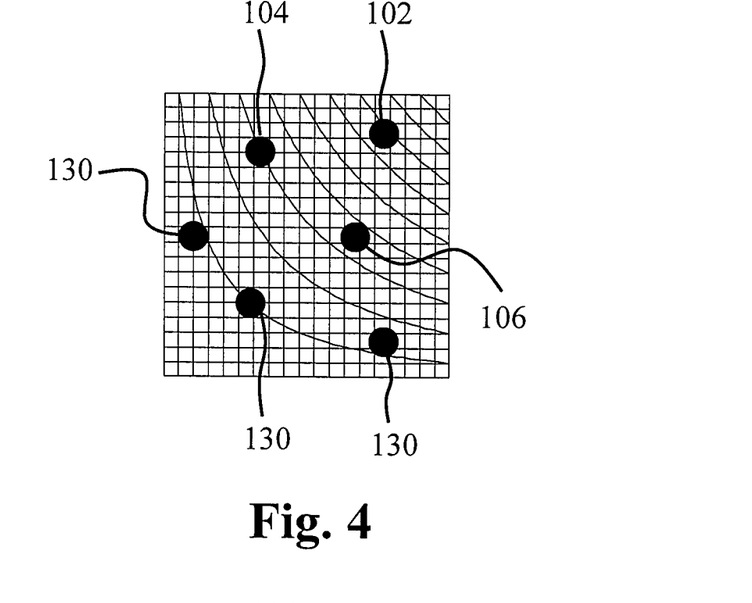
FIG. 4 illustrates a power density map at time t.
Figure 5:
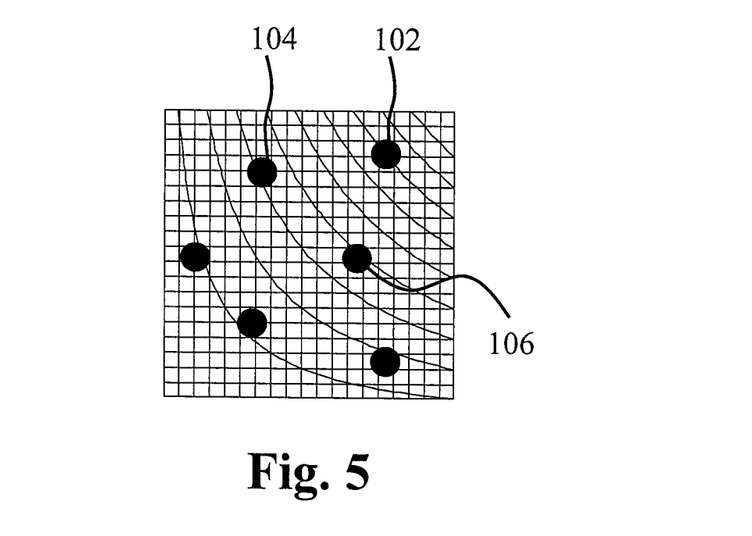
FIG. 5 illustrates a forecasted power density map at time t+Δt.
Figure 6:
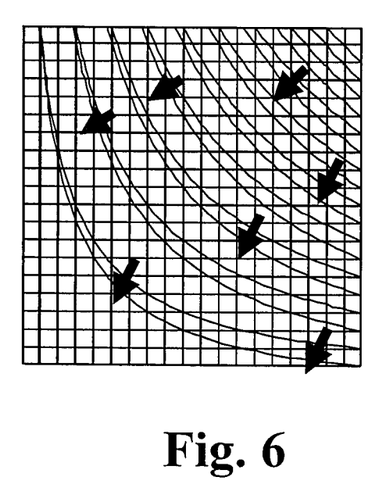
FIG. 6 illustrates a power gradient map.

Another example is shown in FIG. 4-6. FIG. 4 illustrates a geographical map of power densities at time t and FIG. 5 illustrates a map of forecasted power densities at time $t+\Delta t$, where the forecasted power densities are based on power data from wind energy installations 102, 104, 106, 130. In this example the sites of the wind energy installation are identical with the forecasting sites. Iso-power density curves are plotted on the map. The wind energy installations are distributed over a large geographical area. The forecast is based on power gradients which are illustrated in FIG. 6 showing a mapping of the power gradients based on power data of the wind energy installations 102, 104, 106, 130. The forecast wind energy production may be obtained by projecting the wind energy production measured at time t along the power gradients.

All publications and existing systems and methods mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

The invention claimed is:

1. Method for forecasting wind energy production, comprising:
   collecting power data indicative of power output from a set of wind energy installations comprising a first wind energy installation at a first site and a second wind energy installation at a second site, and
   estimating available power output at a forecasting site located at a geographic position, the estimating being based on the power data from the set of wind energy installations by projecting the power data to determine at least one of the future power output at the forecasting site and the current power output at the forecasting site.

2. Method according to claim 1, wherein the forecasting site is identical to one of the first and the second site, and the power data is projected to determine the future power output at the forecasting site.

3. Method according to claim 1, wherein collecting power data comprises collecting at least a first and a second set of power data at a first and a second time, respectively, each set of power data being indicative of power output from at least the first and the second wind energy installations.

4. Method according to claim 1, wherein estimating the available power output comprises projecting the power data to determine the current power output at the geographic position of the forecasting site, wherein projecting comprises at least one of an extrapolation method and an interpolation method based on the power data indicative of power output from the wind energy installations at the first and second sites, wherein the geographic position is outside the first and second wind energy installations.

5. Method according to claim 1, wherein estimating the available power output at the forecasting site is based on weather data of geographic positions of the first and second wind energy installations, the weather data comprising at least one of wind speeds and wind directions.

6. Method according to claim 1, wherein estimating the available power output at the forecasting site is based on at least one of a direction and a magnitude of a power gradient derived from the power data.

7. Method according to claim 1, further comprising calculating one or more power densities from the power data and the estimating is based on the power densities as power data.

8. Method according to claim 1, further comprising calculating one or more unified power densities from the power data and the estimating is based on the uniform power densities as power data.

9. Method according to claim 1, wherein estimating the available power output at the forecasting site comprises estimating one or more unified power densities at the forecasting site.

10. Method according to claim 1, wherein estimating the available power output at the forecasting site is based on cross correlation of power data indicative of power output from the first wind energy installation and the second wind energy installation.

11. Method according to claim 1, wherein estimating the available power output at the forecasting site is based on transport of scalars other than the power output, the scalars comprising at least one of temperature, pressure and gases released in an airflow.

12. Method according to claim 1, further comprising sending data indicative of the available power output at the forecasting site to a wind installation operator.

13. Method for forecasting wind energy, comprising:
   collecting power data indicative of power output from a set of wind energy installations comprising a first wind energy installation at a first site and a second wind energy installation at a second site, and estimating available power output at a forecasting site based on power data from the set of wind energy installations and power gradients derived from the power data.

14. Wind energy production forecasting system comprising a processor and a memory, wherein the processor is configured to perform an operation for estimating available power output at a forecasting site based on power data indicative of power output from a set of wind energy installations, the operation comprising:
   collecting the power data indicative of the power output from the set of wind energy installations comprising a first wind energy installation at a first site and a second wind energy installation at a second site; and
   estimating the available power output at the forecasting site located at a geographic position, the estimating being based on the power data from the set of wind energy installations by projecting the power data to determine at least one of the future power output at the forecasting site and the current power output at the forecasting site.

15. Wind energy forecasting system according to claim 14, comprising an interface for connecting the wind energy forecasting system to a data network, the wind energy forecasting system being adapted for collecting the power data indicative of the power output of the set of wind energy installations comprising the first wind energy installation and the second wind energy installation via the interface.

16. Method according to claim 1, wherein the first wind energy installation comprises a plurality of wind turbines in a first wind park and the second wind energy installation comprises a plurality of wind turbines in a second wind park, wherein the first wind park is separated by a distance from the second wind park.

* * * * *